United States Patent [19]

Meacham et al.

[11] Patent Number: 5,028,910

[45] Date of Patent: Jul. 2, 1991

[54] DRAIN OVERFLOW ALARM

[76] Inventors: Huey W. Meacham; Bradley J. Meacham, both of 9532 Wesso Cir., Shreveport, La. 71118; Dennis E. Meacham, 4240 St. Vincent, Shreveport, La. 71108

[21] Appl. No.: 447,629

[22] Filed: Dec. 8, 1989

[51] Int. Cl.$^5$ ............................................ G08B 21/00
[52] U.S. Cl. .................................... 340/616; 340/623; 340/624; 137/558; 200/61.04; 200/84 R
[58] Field of Search ...................... 340/616, 623, 624; 137/558; 200/61.04, 84 R

[56] References Cited

U.S. PATENT DOCUMENTS

| | | | |
|---|---|---|---|
| 2,985,187 | 5/1961 | Hamilton | 137/558 |
| 3,185,789 | 5/1965 | Gunther | 340/624 |
| 3,634,842 | 1/1972 | Niedermeyer | 340/623 |
| 3,874,403 | 4/1975 | Fischer | 200/61.04 |
| 4,269,147 | 5/1981 | Vorbeck | 137/62 |
| 4,380,243 | 4/1983 | Braley | 340/624 |
| 4,398,186 | 8/1983 | Statz | 340/616 |
| 4,748,300 | 5/1988 | Anderson | 340/624 |
| 4,771,272 | 9/1988 | Barnes | 340/624 |

Primary Examiner—Reinhard J. Eisenzopf
Assistant Examiner—Kinfe-Michael Negash
Attorney, Agent, or Firm—John M. Harrison

[57] ABSTRACT

A drain overflow alarm for a washing machine drain, which alarm is mounted in a vertical drain line offset provided with a check valve and extending from the vertical fixed drain line or standpipe of a structure. In a preferred embodiment the alarm includes a float switch located in the top end of the drain line offset and a transformer, relay, alarm and optical reset button, all provided in a control housing. The float switch is electrically connected to the transformer, relay and alarm, such that obstruction of the fixed drain line causes water to rise in the fixed drain line and through the check valve into the drain line offset. The rising water raises the float element of the float switch and closes the switch to activate the transformer relay and alarm, as well as terminate operation of the washing machine. Clearing of the drain line allows water to flow from the drain line and drain line offset, which causes the float element to drop, and manipulation of the optional reset button facilitates resumption of operation of the washing machine. Alternatively, current to the washing machine may be automatically restored when the float switch is opened, without the necessity of using a reset button.

4 Claims, 1 Drawing Sheet

DRAIN OVERFLOW ALARM

BACKGROUND OF THE INVENTION

1. Cross-References to Related Applications

This application contains subject matter which is related to the disclosure in my copending application Ser. No. 07/396,112, filed Aug. 21, 1989.

2. Field of the Invention

This invention relates to water-activated alarm systems and more particularly, to a drain overflow alarm which responds to a high water level condition in a vertical washing machine drain line or standpipe to sound an alarm and terminate operation of a washing machine. In a most preferred embodiment of the invention, the drain overflow alarm is characterized by a float switch mounted in a vertical offset segment of the vertical, fixed drain line or standpipe which receives wash water from the washing machine and a transformer, relay, alarm and optional reset button electrically connected to the float switch. If the fixed drain line or connecting drain system becomes obstructed, water rises in the fixed drain line and in the drain line offset and causes the float element of the float switch to rise, thereby closing the float switch and energizing the transformer, relay and alarm circuit for sounding an audible or visual alarm or both, and terminating operation of the washing machine. Removal of the obstruction in the fixed drain line allows the water to flow from the fixed drain line and drainage of the drain line offset and operation of the washing machine is resumed, responsive to return of the float element in the float switch to its normal "switch open" position and manipulation of the reset button. Alternatively, the washing machine may be restarted automatically upon opening of the float switch, by altering the design of the relay, transformer and alarm circuit.

A common problem in all structures containing washing machines is the periodic obstruction and overflow of the washing machine drain line or standpipe, which overflow frequently causes damage to and/or in the structure. Since there is normally no alarm system provided in a conventional washing machine, overflow water from the washing machine is pumped into the drain line and will overflow from the drain line to the floor of the structure if the drain line is obstructed, thereby causing damage to tile, carpet and other floor coverings, as well as the structure itself. Depending upon the proximity of the washing machine to the more expensive floor coverings such as carpet, wood overlay and the like, a considerable amount of damage can be caused by drain line overflow in a single washing machine cycle.

DESCRIPTION OF THE PRIOR ART

Various alarm systems designed to terminate operation of a washing machine or dishwasher are known in the art. Typical of these systems is U.S. Pat. No. 3,862,433, dated Jan. 21, 1975, to Leroy H. Rousselt, entitled "Washing Machine Outlet Device". This device includes a box having a water level-actuated switch mounted in a trough adjacent the drain, the switch being arranged to break the electrical circuit to the washing machine when the drain is obstructed. U.S. Pat. No. 4,271,861, dated Jun. 9, 1981, to John G. Crawford, details a "Dishwasher Fill Level Control Arrangement", which incorporates a float assembly positioned in a centrally located sump in close proximity to a horizontally rotating circulation pump impeller inlet area. The float assembly operates to terminate the incoming water when the liquid level rises slightly above the dynamic prime level, to enable lower water usage. A flood control for a dishwasher is detailed in U.S. Pat. No. 4,301,829, dated Nov. 24, 1981, to Richard A. Rowe. The flood control device operates to automatically terminate the end-flow to a dishwasher tub from the water supply, in the event that the tub water rises to a flood level. The flood control device includes a sealing plunger disposed in a plunger body member housing installed downstream of the water fill valve. The sealing plunger tends to be moved to the sealing position by the line water pressure to shut off inflow to the dishwasher, but is blocked from movement to this position whenever the water level is below the flood level, by the stem of a float positioned in the dishwasher tub. U.S. Pat. No. 4,418,712, dated Dec. 6, 1983, to Charles A. Braley, details an "Overflow Control System" for use with home appliances such as a washing machine which uses a standpipe as a drain. A standpipe is equipped with an attachment having a displacement, conductivity or pressure sensor therein for sensing the height of liquids in the standpipe. Signals from the sensors may be used to shut off the power to the appliance and to excite an alarm in the event of water rising in the standpipe due to blockage of the drain system. An overfill sensing system is detailed in U.S. Pat. No. 4,780,705, dated Oct. 25, 1988, to Michael J. Beane. The system utilizes a compacitive sensor on the interior of a tank for sensing the presence of a liquid to cease the filling process. The capacitive sensor includes a sensing capacitor and a reference capacitor located on separate arms of a bridge circuit and an oscillator supplies an AC signal to the bridge circuit, divided by variable resistor to balance the bridge. Various other components complete the sensing system, in order to cease the filling process from a filling facility when a liquid has been detected in the tank.

It is an object of this invention to provide a drain overflow alarm for mounting in an offset to the upright drain or standpipe of a washing machine drain system and operating to terminate operation of the washing machine when the drain line becomes obstructed.

Another object of the invention is to provide a drain overflow alarm which is characterized by a float switch mounted in a drain line offset provided in a fixed drain line or standpipe which serves to drain water from a washing machine, and a transformer, relay and alarm circuit, as well as an optional reset button electrically attached to the float switch, for terminating operation of the washing machine responsive to rising water in the fixed drain line and the drain line offset.

Yet another object of the invention is to provide a drain overflow alarm which includes a vent-equipped drain line offset provided with a check valve and extending from a fixed drain line or standpipe which serves the washing machine drain, the drain overflow alarm further including a float switch having a float element slidably mounted in the top of the drain line offset adjacent to the vent, and a transformer, relay and alarm circuit provided in electrical contact with the float switch, for indicating an alarm and terminating operation of the washing machine when the drain line becomes obstructed and water rises in the drain line offset to activate the float switch.

SUMMARY OF THE INVENTION

These and other objects of the invention are provided in a new and improved drain overflow alarm which includes a float switch mounted in the top end of a drain line offset located in the primary drain line or standpipe serving a washing machine drain, which drain line offset is provided with a check valve and a vent located in the top of the drain line offset for bleeding air from the drain line offset responsive to rising water in the primary drain line and the drain line offset, due to an obstruction in the drain system. A transformer, relay and alarm are electrically connected to the float switch, in order to sound and/or indicate the alarm and terminate operation of the washing machine when the water causes the float element of the float switch to rise and complete the float switch circuit. In a most preferred embodiment, a reset button is provided in the drain overflow alarm circuit to reset the relay and begin operation of the washing machine when the primary drain line or connecting drain system is cleared of the obstruction.

BRIEF DESCRIPTION OF THE DRAWING

The invention will be better understood by reference to the accompanying drawing, wherein.

DESCRIPTION OF THE PREFERRED EMBODIMENTS

Figure 1:
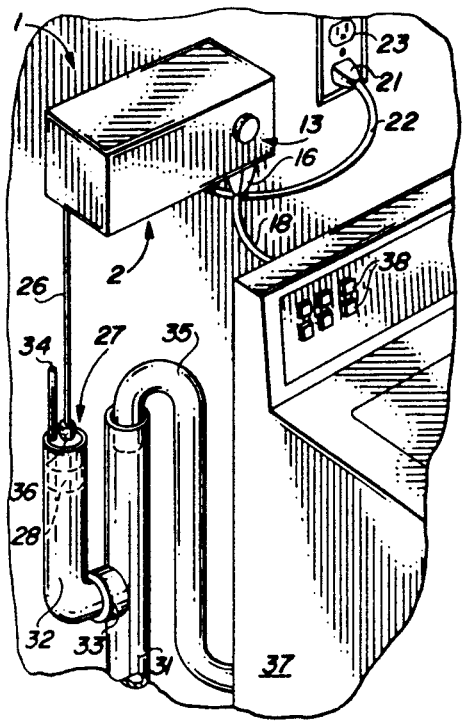
FIG. 1 is a perspective view, partially in section, of a preferred embodiment of the drain overflow alarm of this invention.
Figure 3:
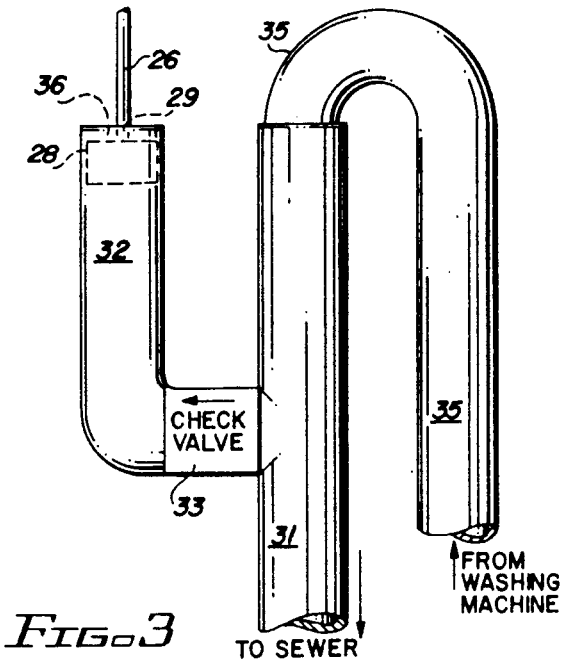
FIG. 3 is a side view, partially in section, of a typical fixed drain line and a drain line offset extending from the fixed drain line for receiving the float switch component of the drain overflow alarm.
Figure 2:
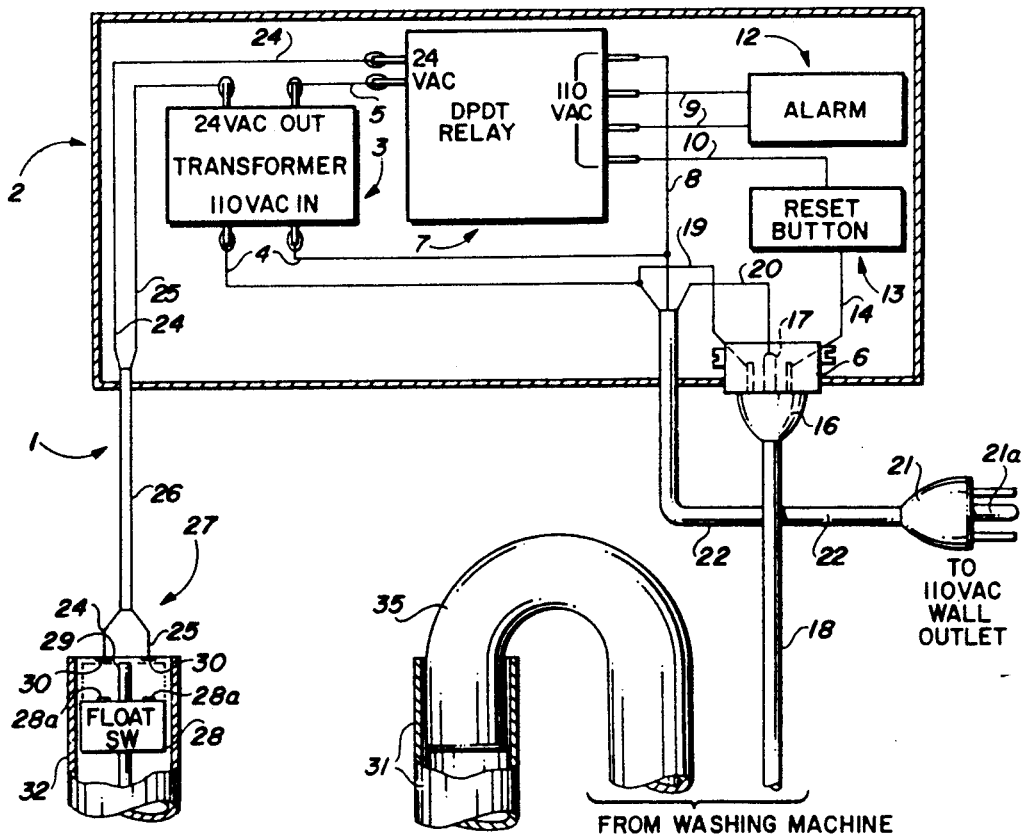
FIG. 2 is a sectional view of a typical control housing, including transformer, relay, alarm and reset button components electrically connected to a float switch, which components together characterize a preferred embodiment of the drain overflow alarm of this invention.

Referring initially to FIGS. 1 and 2 of the drawing, in a preferred embodiment the drain overflow alarm of this invention is generally illustrated by reference numeral 1. The drain overflow alarm 1 includes a control housing 2 provided with a transformer 3, a relay 7, an alarm 12 and a float switch 27, which float switch 27 is mounted in a vertical drain line offset 32, attached to a vertical standpipe or fixed drain line 31. In a most preferred embodiment of the invention, a reset button 13 is located in the control housing 2 and is wired to the relay 7 and a check valve 33 and offset drain valve 30 are positioned in the drain line offset 32, as illustrated in FIG. 3. As further illustrated in FIGS. 1 and 2, transformer supply conductors 4 connect the transformer 3 to a relay supply conductor 8 and a transformer supply-housing receptacle conductor 19. Furthermore, the relay supply conductor 8 connects the relay 7 to the wall outlet plug 21 of an alarm power cord 22, while the transformer supply-housing receptacle conductor 19 connects one of the transformer supply conductors 4 to a housing receptacle 6, provided in the control housing 2, for receiving a washing machine plug 16. The housing receptacle 6 is designed to receive the washing machine plug 16, which is provided on the extending end of a washing machine power cord 18, connected to a washing machine 37, as illustrated in FIGS. 1 and 2. A transformer-relay conductor 5 connects the transformer 3 to the relay 7, while a transformer-float switch conductor 25 connects the transformer 3 to a fixed contact 30 in the float switch 27, mounted in the top end of the drain line offset 32, as described above. The opposite fixed contact 30 of the float switch 27 is electrically connected to the relay 7 by means of a relay-float switch conductor 24. The fixed contact 30 may be of the same design as the housing contacts 14a detailed in my copending application Ser. No. 07/396,112, filed Aug. 21, 1989, referenced herein. Alarm conductors 9 connect the alarm 12 to the relay 7 and a reset button-relay conductor 10 connects the relay 7 to the reset button 13, as further illustrated in FIG. 2. A reset button-housing receptacle conductor 14 connects the reset button 13 to the housing receptacle 6 and a ground line 20 extends from the wall outlet plug ground 21a, in the wall outlet plug 21, through the alarm power cord 22 to the washing machine plug receptacle ground 17 in the housing receptacle 6. A switch line sheath 26 encapsulates the relay-float switch conductor 24 and the transformer-float switch conductor 25, as further illustrated in FIGS. 1–3. In a most preferred embodiment of the invention, the relay 7 is a double pole, double throw relay which operates on a 24 volt current supplied by the transformer 3, as hereinafter further described.

Referring again to FIG. 1, a vent 34 extends through a vent cap 36, which seals the top of the drain line offset 32, to facilitate escape of air from the drain line offset 32 when water rises in the fixed drain line 31 and through the check valve 33 into the drain line offset 32, responsive to plugging of the fixed drain line 31, as hereinafter further described. Alternatively, an opening can be provided in the vent cap 36 in lieu of the projecting vent 34, as desired. The switch line sheath 26 projects through the vent cap 36 and the relay-float switch conductor 24 and transformer-float switch conductor 25 are attached to the fixed contacts 30 provided in the float switch 27, as described above. In a preferred embodiment of the invention, the float switch 27 is characterized by a magnetic reed-type float switch, the operation and design of which is well known to those skilled in the art. Alternatively, conventional mechanical snap-action micro-switches and other known float-type switches can be utilized in the float switch 27 of the drain overflow alarm 1, including the fixed contacts 30, illustrated in FIG. 2 of the drawing without departing from the spirit and scope of this invention. As further illustrated in FIGS. 2 and 3, the float switch 27 is further characterized by a float 28, provided with spaced float contacts 28a, and slidably mounted on a float rod 29 and the float switch 27 is normally open, with the float 28 located at the bottom of the float rod 29, as illustrated in FIG. 2. Rising of water in the drain line offset 32 also raises the float 28 and engages the float contacts 28a with the fixed contacts 30, to close the float switch 27. Alternatively, the float 28 may be provided with an internal magnet (not illustrated), where the float switch 27 is a magnetic, reed-type switch and rising of the float 28 on the float rod 29 to the position illustrated in phantom in FIG. 3 responsive to water rising in the drain line offset 32 also closes the float switch 27 and energizes the alarm 12, as hereinafter further described.

As further illustrated in the drawing, the washing machine 37 is provided with a conventional flexible drain hose 35, the curved discharge end of which projects into the open top of the fixed drain line 31, in order to drain the washing machine 37 at the end of a washing cycle. Conventional control buttons 38 are provided in the washing machine 37 for operating purposes and the fixed drain line 31 is a conventional vertical standpipe for receiving the discharge end of the flexible drain hose 35.

Referring again to the drawing, the washing machine 37 is prepared for operation by inserting the washing machine plug 16 into the housing receptacle 6 and the wall outlet plug 21 into the wall outlet 23. The appropriate control buttons 38 provided on the washing machine 37 are then pressed in a selected sequence to start a washing cycle. As the drain phase of the washing cycle begins, water is pumped from the washing machine through the flexible drain hose 35 and into the fixed drain line 31, to the connecting drain lines and sewer (not illustrated). If the fixed drain line 31 or the connecting drain line or sewer should become plugged or even partially obstructed, water flowing from the washing machine 37 through the flexible drain hose 35 and into the fixed drain line 31 begins to rise in the fixed drain line 31 and enters the drain line offset 32 through the check valve 33, while air is displaced from the drain line offset 32 through the vent 34. As water continues to rise in both the fixed drain line 31 and the drain line offset 32, the water contacts the float 28, thereby raising the float 28 on the float rod 29, as illustrated in FIGS. 2 and 3. When the float 28 reaches a predetermined point on the float rod 29, which predetermined point is dictated by the design of the float switch 27, the float contacts 28a on the float 28 engage the fixed contacts 30 and the normally open float switch 27 is closed. A 24 volt current from the transformer 3 then energizes the relay 7, which is most preferably characterized as a double pole, double throw relay. This action activates the 110 volt alarm 12 and terminates the flow of electric current through the washing machine power cord 18, thereby terminating operation of the washing machine 37. After the obstruction is removed from the fixed drain line 31, water slowly drains from the drain line offset 32, the float 28 drops on the float rod 29 to reopen the float switch 27 and the water is again allowed to freely flow from the washing machine 37 through the flexible drain hose 35 and the fixed drain line 31. The reset button 13 is then pressed, which action again causes the double pole, double throw relay 7 to trip and allows electric current to again flow through the washing machine power cord 18 from the alarm power cord 22. Drainage of water from the check valve 33 in the reverse direction against the seated swing check element (not illustrated) is effected by drilling a small hole (not illustrated) in the valve housing or the swing check. This slow reverse drainage of water serves as a buffer against sudden surges of water through the check valve 33 into the drain line offset 32 from the fixed drain line 31, due to additional drainage of water into the fixed drain line 31 from the flexible drain hose 36. The precaution prevents rapid on-off cycling of the float switch 27 and the washing machine 37.

It will be appreciated that the drain overflow alarm of this invention offers a convenient, efficient and inexpensive technique for controlling the operation of a washing machine in the event of obstruction of a drain line, connecting line or sewer. It will be further appreciated that the invention is further applicable to a dishwasher, it being only necessary to adapt the dishwasher drain with the drain line offset and associated drain overflow alarm components in the manner detailed above. Moreover, the reset button 13 can be removed from the control housing 2 and the transformer 3, double pole, double throw relay 7 and alarm 12 can be wired to automatically resume operation of the washing machine 37 when the float switch 27 is opened.

While the preferred embodiments of the invention have been described above, it will be recognized and understood that various modifications may be made in the invention and the appended claims are intended to cover all such modifications which may fall within the spirit and scope of the invention.

Having described my invention with the particularity set forth above, what is claimed is:

1. A drain overflow alarm for a vertical washing machine drain line, comprising a drain line offset extending from the vertical drain line, a check valve provided in said drain line offset for receiving water from the vertical drain line into said drain line offset and a drain opening provided in said check valve for slowing the flow of water from said drain line offset back into the vertical drain line; a magnetic float switch provided in said drain line offset, said magnetic float switch further comprising a float slidably disposed in said drain line offset; a transformer electrically connected to said magnetic float switch; and a relay electrically connected to said transformer for sequentially interrupting the flow of electric current to the washing machine when water rises in the vertical drain line and flows through said check valve into said drain line offset and raises said float to close said magnetic float switch and restoring the flow of electric current to the washing machine when water flows from said drain line offset through said drain opening, back into the vertical drain line to lower said float and open said magnetic float switch 2. The drain overflow alarm of claim 1 further comprising reset means electrically connected to said relay for resetting said relay and re-establishing the flow of electric current to the washing machine after said magnetic float switch reopens.

3. The drain line overflow alarm of claim 2 further comprising alarm means electrically connected to said relay for indicating interruption of said flow of electric current to the washing machine responsive to closing of said magnetic float switch.

4. The drain line overflow alarm of claim 3 further comprising vent means provided in said drain line offset for venting air from said drain line offset when water rises in the vertical drain line and said drain line offset.

* * * * *